United States Patent
Paulauskas et al.

(10) Patent No.: US 6,401,033 B1
(45) Date of Patent: Jun. 4, 2002

(54) NAVIGATION SYSTEM WITH GAME PLAYING FEATURE

(75) Inventors: Cynthia Paulauskas; Theresa Paulauskas, both of Chicago, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/654,556

(22) Filed: Sep. 1, 2000

(51) Int. Cl.⁷ .................. G06F 17/00; G01C 21/00; A63F 9/24
(52) U.S. Cl. .................. 701/207; 701/200; 340/990; 370/310
(58) Field of Search ............... 701/1, 207, 36, 701/213, 200, 201, 208; 463/25, 29, 40; 340/990; 370/310; 455/899

(56) References Cited

U.S. PATENT DOCUMENTS

| | | | |
|---|---|---|---|
| 4,878,170 A | 10/1989 | Zeevi | 364/449 |
| 5,157,614 A | 10/1992 | Kashiwazaki et al. | 364/443 |
| 5,528,248 A | 6/1996 | Steiner et al. | 342/357 |
| 5,552,989 A | 9/1996 | Bertrand | 364/443 |
| 5,618,232 A * | 4/1997 | Martin | 463/25 |
| 5,794,164 A * | 8/1998 | Beckert et al. | 701/1 |
| 5,802,492 A | 9/1998 | DeLorme et al. | 701/200 |
| 5,944,768 A * | 8/1999 | Ito et al. | 701/200 |
| 5,957,958 A | 9/1999 | Wong et al. | 607/56 |
| 5,967,898 A * | 10/1999 | Takasaka et al. | 463/37 |
| 5,982,301 A | 11/1999 | Ohta et al. | 340/995 |
| 6,009,363 A * | 12/1999 | Beckert et al. | 701/33 |
| 6,046,689 A | 4/2000 | Newman | 340/996 |
| 6,053,815 A * | 4/2000 | Hara et al. | 463/46 |
| 6,080,063 A * | 6/2000 | Khosla | 463/42 |
| 6,095,522 A * | 8/2000 | Spell et al. | 273/246 |
| 6,148,253 A * | 11/2000 | Taguchi et al. | 701/48 |
| 6,154,689 A | 11/2000 | Pereira et al. | 701/1 |
| 6,177,887 B1 * | 1/2001 | Jerome | 340/945 |
| 6,266,614 B1 | 7/2001 | Alumbaugh | 701/211 |

* cited by examiner

*Primary Examiner*—Tan Nguyen
*Assistant Examiner*—Dalena Tran
(74) *Attorney, Agent, or Firm*—Frank J. Kozak; Lawrence M. Kaplan (57) ABSTRACT

A vehicle navigation system includes at least one game program that runs on the navigation system hardware and that uses the data in the geographic database to conduct a game session via a user interface of the navigation system.

27 Claims, 8 Drawing Sheets

NAVIGATION SYSTEM WITH GAME PLAYING FEATURE

BACKGROUND OF THE INVENTION

The present invention relates to navigation systems and more particularly the present invention relates to a feature in a navigation system that improves a driving experience by entertaining or educating the driver or passengers while traveling.

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for new features or other improvements. One area in which there is room for improvement relates to enhancing the experience of traveling in an automobile. Ways of enhancing the experience of traveling in an automobile include providing entertainment and information. Modem automobiles are equipped with radios, tape players, and CD players that provide drivers and passengers with entertainment and information while traveling in automobiles. Some automobiles have Internet access or access to other data networks or online providers through which drivers or passengers can obtain additional kinds of entertainment and information. Providing entertainment and information to a vehicle driver and passengers while driving can relieve tedium, thereby making the experience of traveling in an automobile more pleasant and possibly safer.

Although radios, tape players, CD players and Internet access meet some of the needs of vehicle drivers and passengers for entertainment and information while driving, there continues to be a need for new sources of entertainment and information.

SUMMARY OF THE INVENTION

To address these and other objectives, the present invention comprises a feature provided by a navigation system that includes at least one game program that runs on the navigation system hardware and that uses the data in the geographic database to conduct a game session via a user interface of the navigation system. The game program may also use data from the navigation system, such as data indicating a current vehicle location, to make the game session relevant to the vehicle location.

DETAILED DESCRIPTION OF THE PRESENTLY PREFERRED EMBODIMENTS

I. OVERVIEW OF NAVIGATION SYSTEM

Figure 1:
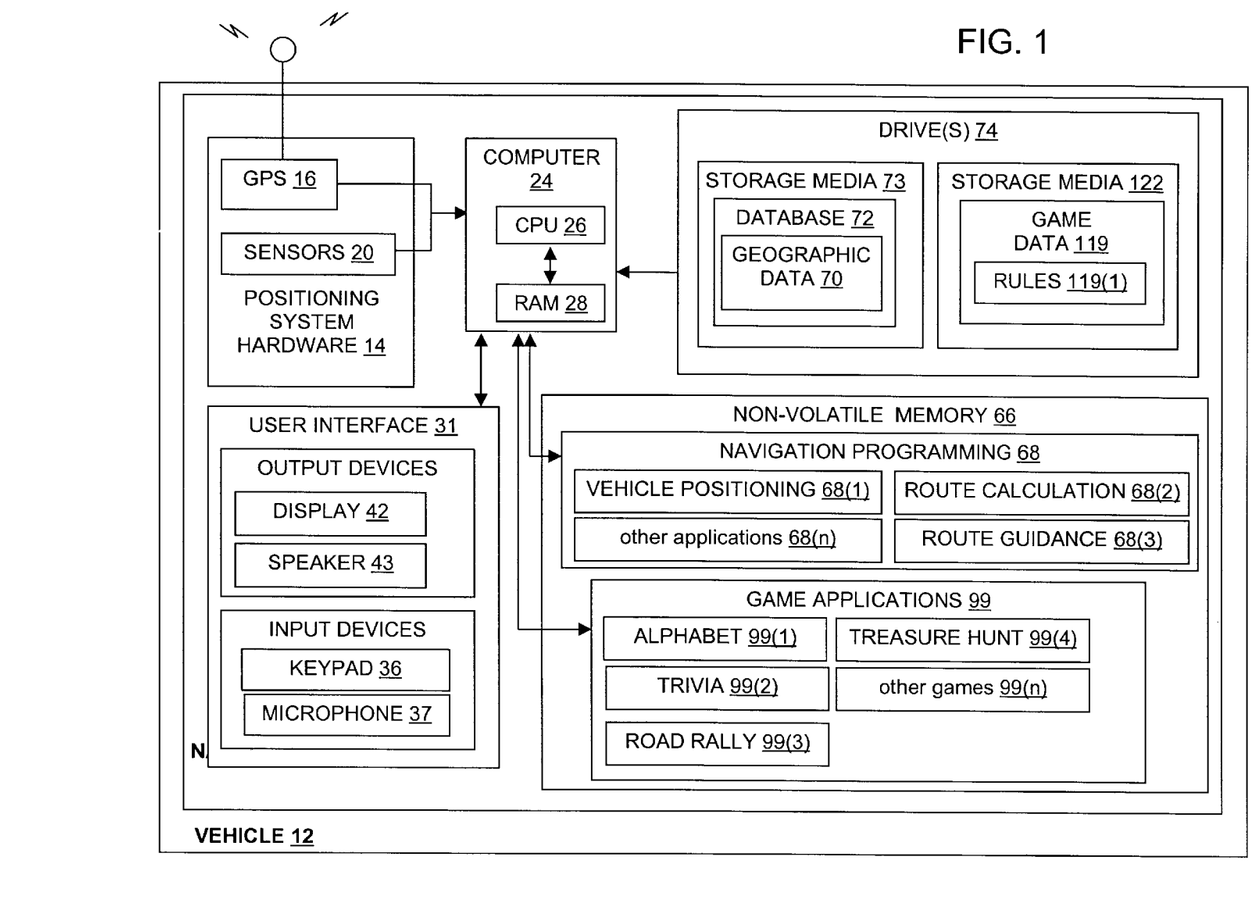
FIG. 1 is a block diagram showing components of a navigation system that includes a game-playing feature.

Referring to FIG. 1, there is a diagram illustrating an exemplary configuration of a navigation system 10. The navigation system 10 is a combination of hardware and software components. In one embodiment, the navigation system 10 is located in a vehicle 12, such as an automobile. The navigation system 10 includes appropriate positioning system hardware 14, which in an exemplary embodiment may include a GPS system 16 and other sensor equipment 20 that senses the vehicle speed, heading, acceleration, etc. In addition, the navigation system 10 includes an appropriate computer 24, including a CPU 26 and memory 28 as well as other appropriate hardware.

Also included as part of the navigation system 10 is a user interface 31. The user interface 31 is coupled to the computer 24. The user interface 31 includes appropriate means for receiving instructions and input from a user as well as means for providing information back to the user. To provide these functions, the user interface 31 includes an input keypad 36 or a touch screen, and possibly other input hardware and software, such as a microphone 37, voice recognition technology, and so on, through which the driver (or passenger) can request navigation information and services. The user interface 31 also includes output hardware and software, such as a display screen 42, speakers 43, speech synthesis technology, etc., through which the driver or passengers can be provided with information from the navigation system 10.

Figure 2:
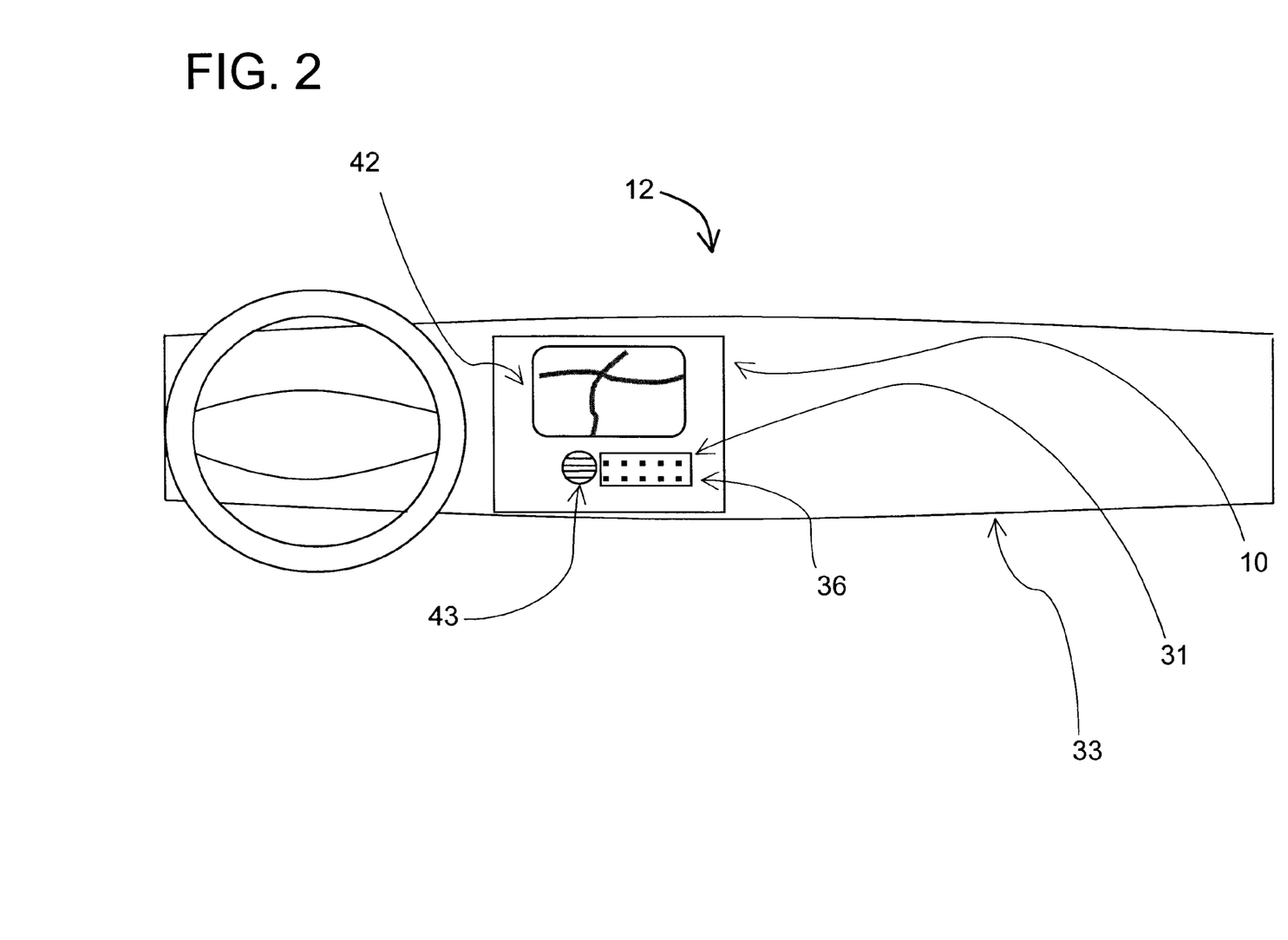
FIG. 2 is an illustration of the navigation system of FIG. 1 installed in a dashboard.

FIG. 2 shows components of the user interface 31. In FIG. 2, the navigation system 10 is installed in a dashboard 33 of the vehicle 12. The components of the user interface 31, including the display 42, the speaker 43, and the keypad 36, are shown installed in a front panel of the navigation system 10.

II. NAVIGATION PROGRAMMING

Referring to FIG. 1, the navigation system 10 includes navigation programming 68. The navigation programming 68 may include separate applications (or subprograms) that provide various navigation-related features of the navigation system 10. Included among these applications is a vehicle positioning application 68(1) that receives inputs from the positioning system hardware 14 and that provides an output that indicates the current vehicle position. Also included among these navigation applications 68 are a route calculation application 68(2) that determines routes to destinations and a route guidance application 68(3) that provides detailed directions for reaching a destination via a calculated route. The navigation programming 68 also includes other navigation applications 68(n). These other navigation application 68(n) may provide for map display and possibly additional navigation-related features. The navigation applications 68 may be written in a suitable computer programming language, such as C, C++, Java, Visual Basic, etc.

The navigation programming 68 may be stored on a storage device 66 (or ROM). During a typical use of the navigation system 10 of FIG. 1, some or all the applications included in the navigation programming 68 are loaded from the ROM 66 into the memory 28 associated with the processor 26. The computer 24 receives input from the user interface 31. The input may include a request for navigation-related information. Information is obtained from the positioning system hardware 14 indicating a position of the vehicle 12. The information from the positioning system hardware 14 may be used by the navigation programming 68 that is run on the processor 26 to determine the location, direction, speed, etc., of the navigation system 10, and hence the vehicle. The features provided by these navigation applications are provided to the user (e.g., the vehicle driver) by means of the user interface 31.

III. THE GEOGRAPHIC DATABASE

Referring to FIG. 1, the navigation programming 68 uses geographic data 70 in order to provide navigation features to an end user. The geographic data 70 includes information about one or more geographic regions or coverage areas. The geographic data 70 may be stored in the vehicle 12 or alternatively, the geographic data 70 may be stored remotely and made available to the navigation programming 68 in the vehicle 12 through a wireless communication system which may be part of the navigation system 10. In another alternative, a portion of the geographic data 70 may be stored in the vehicle 12 and a portion of the geographic data 70 may be stored in a remote location and made available to the navigation programming 68 in the vehicle 12 over a wireless communication system from the remote location.

In the embodiment shown in FIG. 1, some or all of the geographic data 70 are stored on a medium 73 which is located in the vehicle 12. Accordingly, the navigation system 10 includes a drive 74 (or other suitable peripheral device) into which the medium 73 can be installed and accessed. In one embodiment, the storage medium 73 may be removable and replaceable so that a storage medium with an appropriate data for the geographic region in which the vehicle is traveling can be used. In addition, the storage medium 73 may be replaceable so that data on it can be updated easily. In one embodiment, the storage medium 73 is a CD-ROM disk. In another alternative embodiment, the storage medium 73 may be a PCMCIA card in which case the drive 74 would be substituted with a PCMCIA slot. Various other storage media may be used, including fixed or hard disks, DVD disks or other currently available storage media, as well as storage media that may be developed in the future. (Alternatively, the geographic data 70 and the navigation programming 68 may be provided on the same storage device or medium.)

In one embodiment, the geographic data are provided by Navigation Technologies Corporation of Rosemont, Illinois. However, it is understood that the inventive concepts disclosed herein are not restricted to any particular source of data.

Because a navigation system uses data in certain known and expected ways to perform known functions, the geographic data 70 can be organized, structured, and/or arranged in ways that facilitate their use by the navigation system. According to one embodiment, the geographic data 70 used by the navigation system may be organized into one or more databases 72. Some of the ways that geographic data 70 can be can be organized, structured, or arranged are described in U.S. Pat. Nos. 5,968,109, 5,974,419, and 5,953,722, the entire disclosures of which are incorporated by reference herein. According to one embodiment, the geographic data 70 in the one or more databases 72 may be organized into separate subsets of data. These subsets may include routing data (used for calculation of routes to desired destinations), cartographic data (used for map display), maneuver data (used for route guidance), point-of-interest data (for identifying specific points of interest, such as hotels, restaurants, museums, stadiums, airports, etc.), name data (identifying the names of roads, places and other features), places (e.g., cities, states, counties), and postal codes. The geographic data 70 may be defined with different data types or with fewer or more data types.

Each subset of the geographic data 70 includes the data and associated attributes required to perform a particular navigation function but excludes data and attributes which are not needed to perform the function. There is some overlap of data between each of these subsets, with the result that some information may be included in more than one subset. For example, a data entity representing a road segment in the routing data and a data entity representing the same road segment in the cartographic data may include attributes identifying the nodes located at the ends of the road segment. Although this duplication may result in a larger overall data storage requirement, each of the navigation functions benefits from the resultant efficiency of handling smaller amounts of data. To permit these types of data to work together, indexes are included as part of the geographic database. The indexes provide cross-references, search trees, and/or other data finding techniques.

IV. GAME FEATURE IN A NAVIGATION SYSTEM.

A. Overview of navigation system game feature

According to a disclosed embodiment, a navigation system includes a game feature. The game feature allows a user of the navigation system (i.e., a driver or passenger) to play one or more games using the navigation system. Referring to FIG. 1, the game feature is provided by one or more game applications 99 that are included in the navigation system 10. The one or more game applications 99 are software programs. The game applications 99 are stored in a non-volatile memory in the navigation system which may be the same non-volatile memory 66 in which the navigation applications 68 are stored or which may be another non-volatile memory located in the navigation system. The game applications 99 use the geographic data 70. The game applications 99 also use other data, i.e., game data 119. The game data 110 may include game rules 119(1). The game data 119 may be stored on the same media 73 as the geographic data 70 or may be stored on another media 122.

Figure 3:
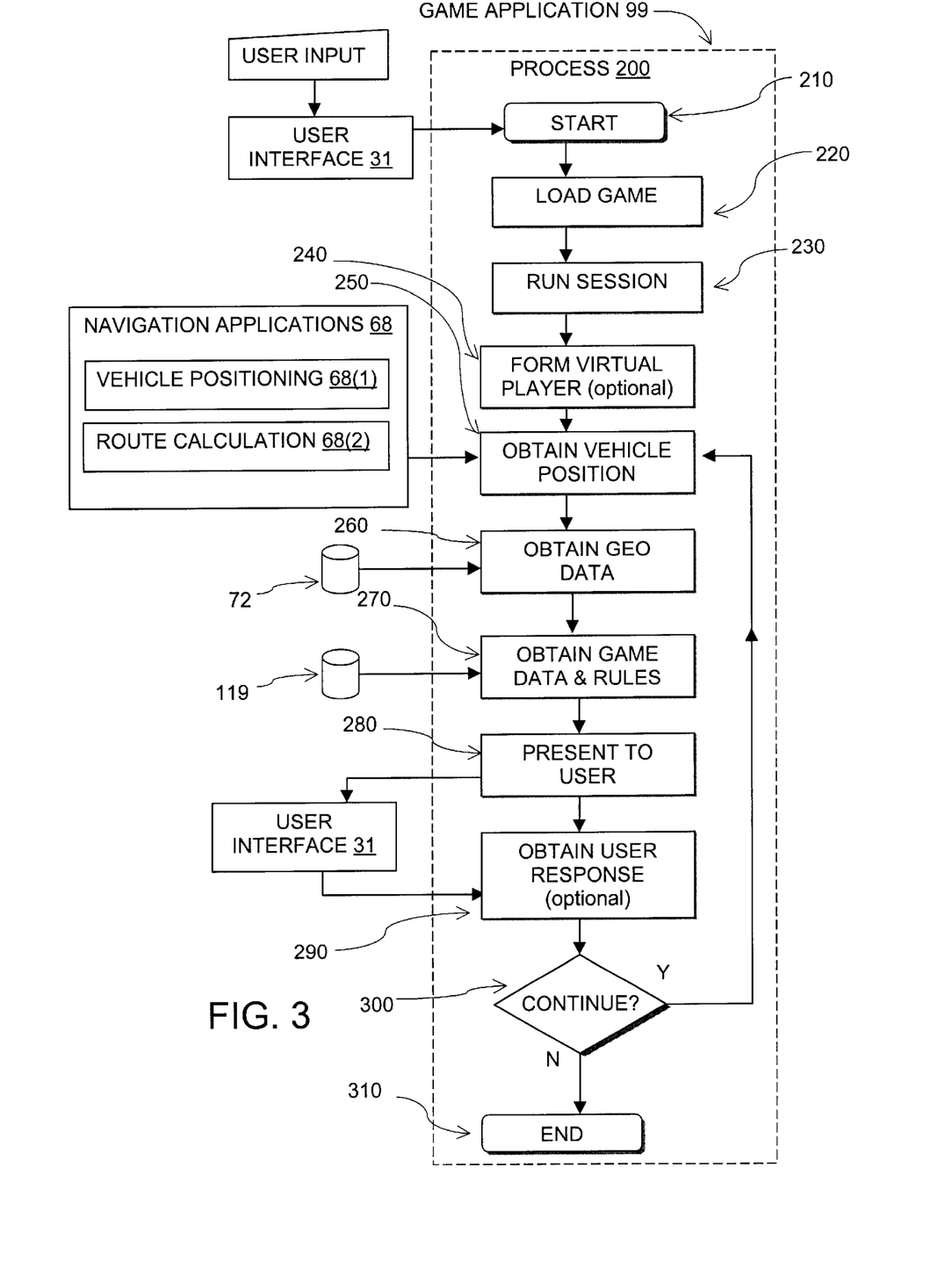
FIG. 3 is a flowchart showing steps performed during operation of one of the game applications shown in FIG. 1.

FIG. 3 shows a process 200 that includes steps performed during operation of one of the game applications 99. The steps included in the process 200 illustrated in FIG. 3 are exemplary of any of the game applications. Different games may include various additional steps or may omit some of the steps shown in FIG. 3.

A user of the navigation system 10 operates the user interface 31 of the navigation system 10 to cause the game feature to run (Step 210). As an example, the navigation system user may use one or more of the input devices (e.g., keypad 36, touch screen) of the user interface 31 to select the game feature from a menu provided on the display screen 42 of the navigation system. Alternatively, the game feature may be started by a voice command from the navigation system user that is received by the microphone 37 and interpreted by voice recognition software in the user interface 31.

When the navigation system user operates the user interface to start the game feature, the selected game application 99 is loaded from the non-volatile memory (66 in FIG. 1) into the RAM of the navigation system (Step 220).

During operation of the game process 200, the game application 99 conducts a game session (Step 230). As part of the game session, the game application 99 may create a virtual player (Step 240). The virtual player is a temporary identity created by the navigation game application 99 that the navigation system user can play against. The creation of a virtual player is optional, i.e., the navigation system user may choose not to have a virtual player to play against or alternatively, the particular game application may not support a virtual player. When creating a virtual player, the game application process 200 may provide the navigation system user with the option of selecting a player level for the virtual player. The player levels may include expert, intermediate, beginner, etc.

During a game session, the game application 99 receives inputs from the navigation application applications 68 (Step 250). As an example, the game application 99 receives input indicating the current position of the vehicle from the vehicle positioning application 68(1). If the vehicle is traveling along a calculated route, the game application 99 may receive data indicating the road segments in the calculated route from the route calculation application 68(2) or the route guidance application 68(3).

During a game session, the game application 99 also obtains geographic data from the geographic database 72 (Step 260) and game data 119 (Step 270). The game data 119 may include game rules of play 119(1). Using these data, the game application 99 presents information to the navigation system user via the user interface 31 (Step 280). The information presented to the navigation system user is part of the game play. The information presented to the navigation system user may be a trivia question, an alphabet letter, etc. The game application process 200 then accepts a response from the navigation system user (Step 290). The response may be the navigation system user's response to the information presented by the game process to the user in the previous step (i.e., Step 280). The response step is optional depending on the type of game being played, i.e., in some games, no response is required.

Following the user's response (if provided), the session continues by looping back (Step 300) to the step in which data are obtained from the navigation applications 68 (i.e., Step 250). Alternatively, the game session ends (Step 310). The game session ends when the user indicates via the user interface 31 that play is no longer desired. Alternatively, the game session may end in accordance with the game rules 119, i.e., when there is a winner.

Some of the games that can be included among the navigation games 99 are described below.

B. Navigation games

1. Sign text alphabet game embodiment

One of the games provided by the navigation system 10 is a sign text alphabet game (i.e., 99(1) in FIG. 1). A navigation system user starts the sign text alphabet game by providing appropriate input into the user interface 31, as described above in connection with FIG. 3. When the navigation system user starts the sign text alphabet game 99(1), the game is loaded into memory and a game session is begun. During a game session for the sign text alphabet game, the sign text alphabet game application 99(1) receives the output from the vehicle positioning application 68(1) that indicates the current position of the vehicle along a road segment represented by data contained in the geographic database 72. The sign text alphabet game application 99(1) also obtains geographic data 70 indicating sign text information from the geographic database 72. In particular, the sign text alphabet game application 99(1) obtains the sign text information for upcoming signs along the road segment upon which the vehicle is traveling. If the vehicle is traveling along a calculated route, the sign text alphabet game application 99(1) also obtains the sign text information for upcoming signs along the calculated route beyond the road segment upon which the vehicle is traveling.

Figure 4:
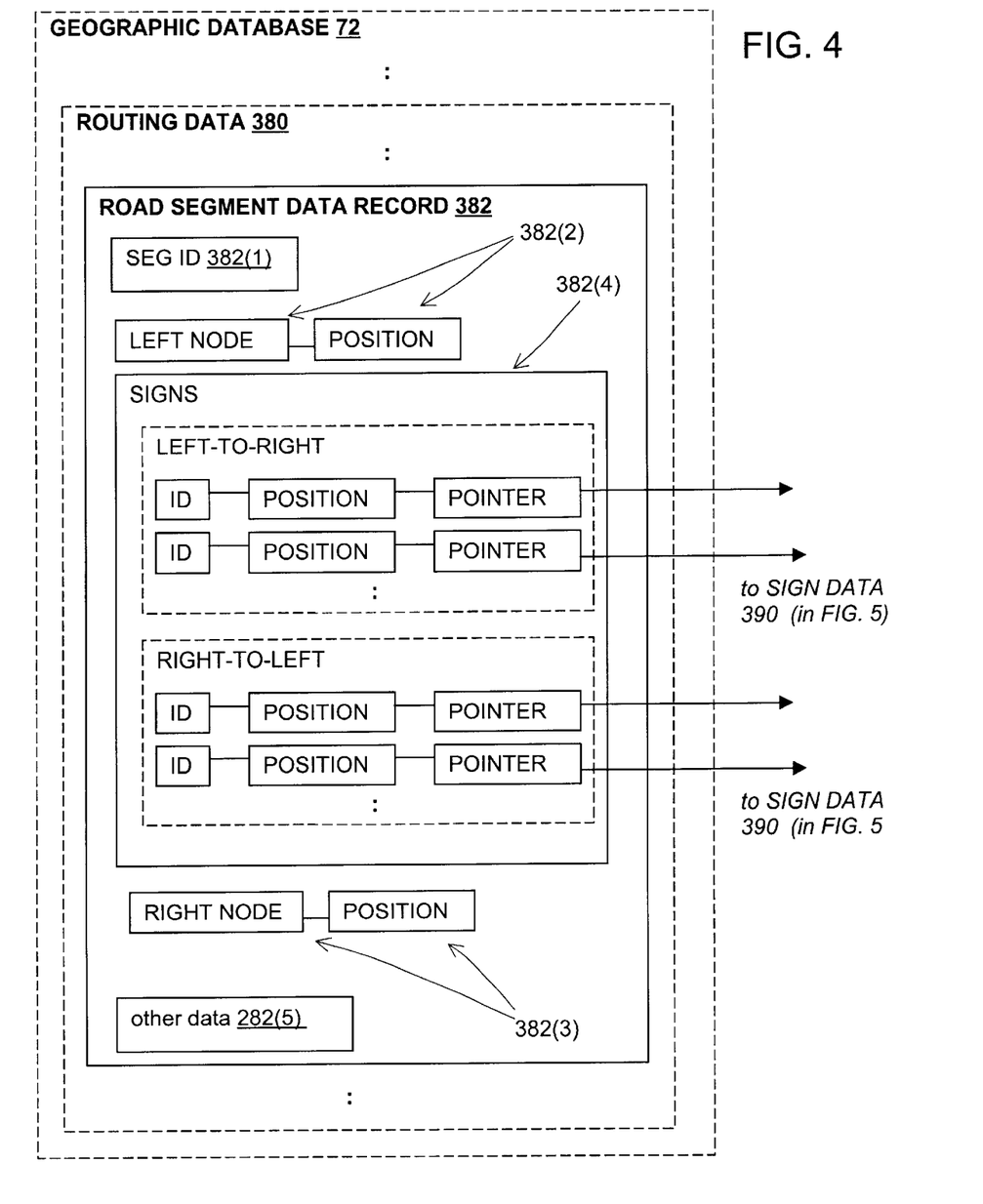
FIG. 4 is a block diagram showing components of one of the types of data included in the geographic database of FIG. 1.
Figure 5:
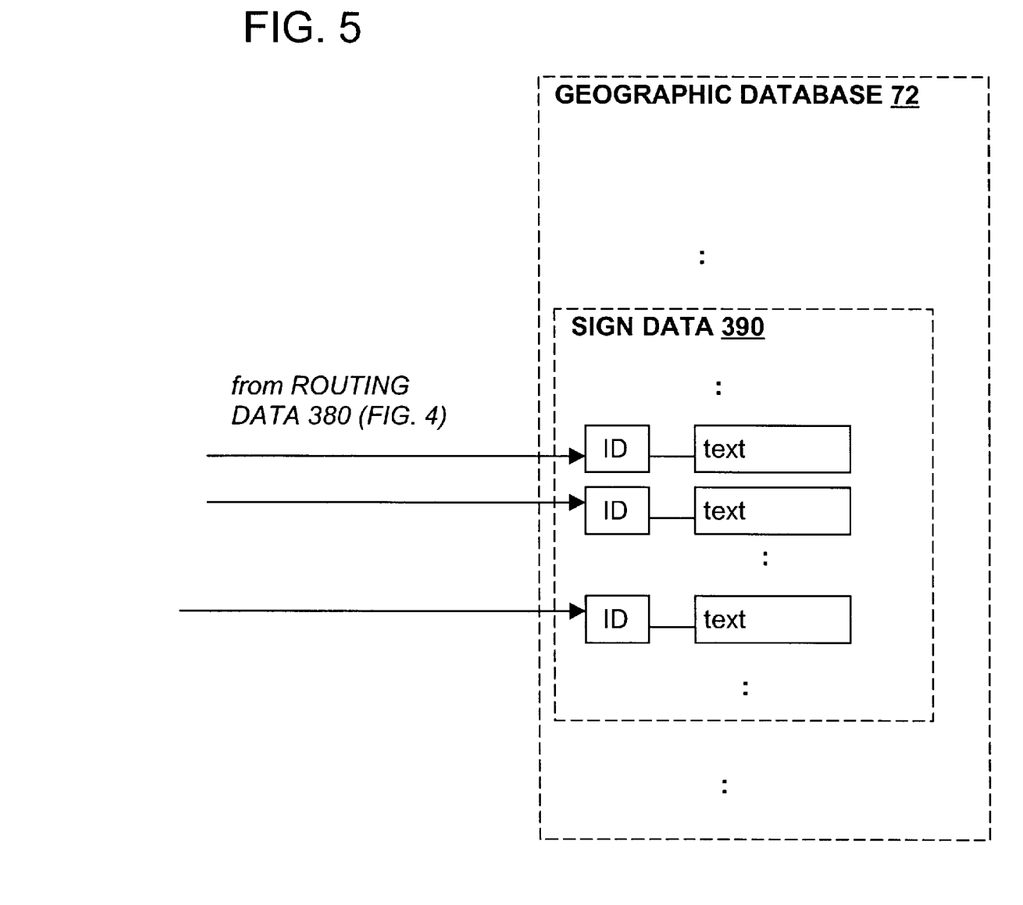
FIG. 5 is a block diagram showing components of the road sign data included in the geographic database of FIG. 1.

FIGS. 4 and 5 show the kinds of geographic data used by the sign text alphabet game. FIG. 4 shows some of the components included in a routing data subset 380 of the geographic database 72. The routing data subset 380 includes a plurality of road segment data records 382 each of which includes data about a separate road segment located in the coverage area of the geographic database 72. A road segment record 382 includes a segment ID 382(1) by which the data record can be identified in the geographic database 72. The road segment data record 382 includes data 382(2) and 382(3) that indicate the locations of the endpoints (also referred to as "nodes") of the road segment. The locations of the endpoints may be specified in either absolute or relative coordinates.

The road segment record 382 may also include or be associated with other data 382(5) that refer to various other attributes of the represented road segment. For example, the road segment data record may include data identifying what turn restrictions exist at each of the nodes which correspond to intersections at the ends of the road portion represented by the road segment, the name or names by which the represented road segment is known, the street address ranges along the represented road segment, and so on. The various attributes associated with a road segment may be included in a single road segment record, or preferably are included in more than one type of record which are cross-referenced to each other.

In this embodiment, the road segment record 382 includes data 382(4) relating to the roadside signs located along the represented road segment. The data 382(4) include an entry for each roadside sign that is located along the represented road segment. Each entry in the roadside sign data 382(4) includes an ID by which the represented roadside sign may be identified. Each entry in the roadside sign data 382(4) also includes data indicating a position of the represented roadside sign. The position data may be expressed as an absolute or a relative position. In this embodiment, each entry in the roadside sign data 382(4) includes a pointer. The pointer refers to an entry in a collection of sign information data 390. The collection of sign information data 390 may be a separate subset of the geographic data 70 or alternatively, the sign information data 390 may be included as a part of one of the other subsets of data included in the geographic database 72. In the embodiment of FIGS. 4 and 5, the sign information data 390 are a separate subset of data included in the geographic database 72.

FIG. 5 shows some of the components of the sign information data 390. The sign information data 390 includes a plurality of entries. Associated with each entry in the sign information data 390 is an ID. The ID is a unique identifier by which the sign may be identified. Also associated with each entry in the sign data 390 are data indicating the sign text. The sign text can be displayed on the display (42 of FIGS. 1 and 2) or alternatively, the data indicating the sign text may be provided as audio data that can be played over the speaker (42 of FIGS. 1 and 2).

Referring again to FIG. 4, the sign data 382(4) includes two groups of entries. One group of entries represents the roadside signs along the represented road segment that are observable when traveling along the road segment from the right node to the left node and the other group of entries represents the roadside signs along the represented road segment that are observable when traveling along the road segment from the left node to the right node.

Using the data indicating the vehicle position and the geographic data 70 indicating the text of upcoming signs, the sign text alphabet game application 99(1) determines the first letter of the upcoming sign. Then, the sign text alphabet game application 99(1) indicates via the user interface 31 the first letter of the upcoming sign to the navigation system user. For example, the sign text alphabet game application 99(1) may indicate the first letter of the upcoming sign by using the speaker 43 or the display 42. If the speaker 43 is used, text-to-speech software may be used.

Figure 6:
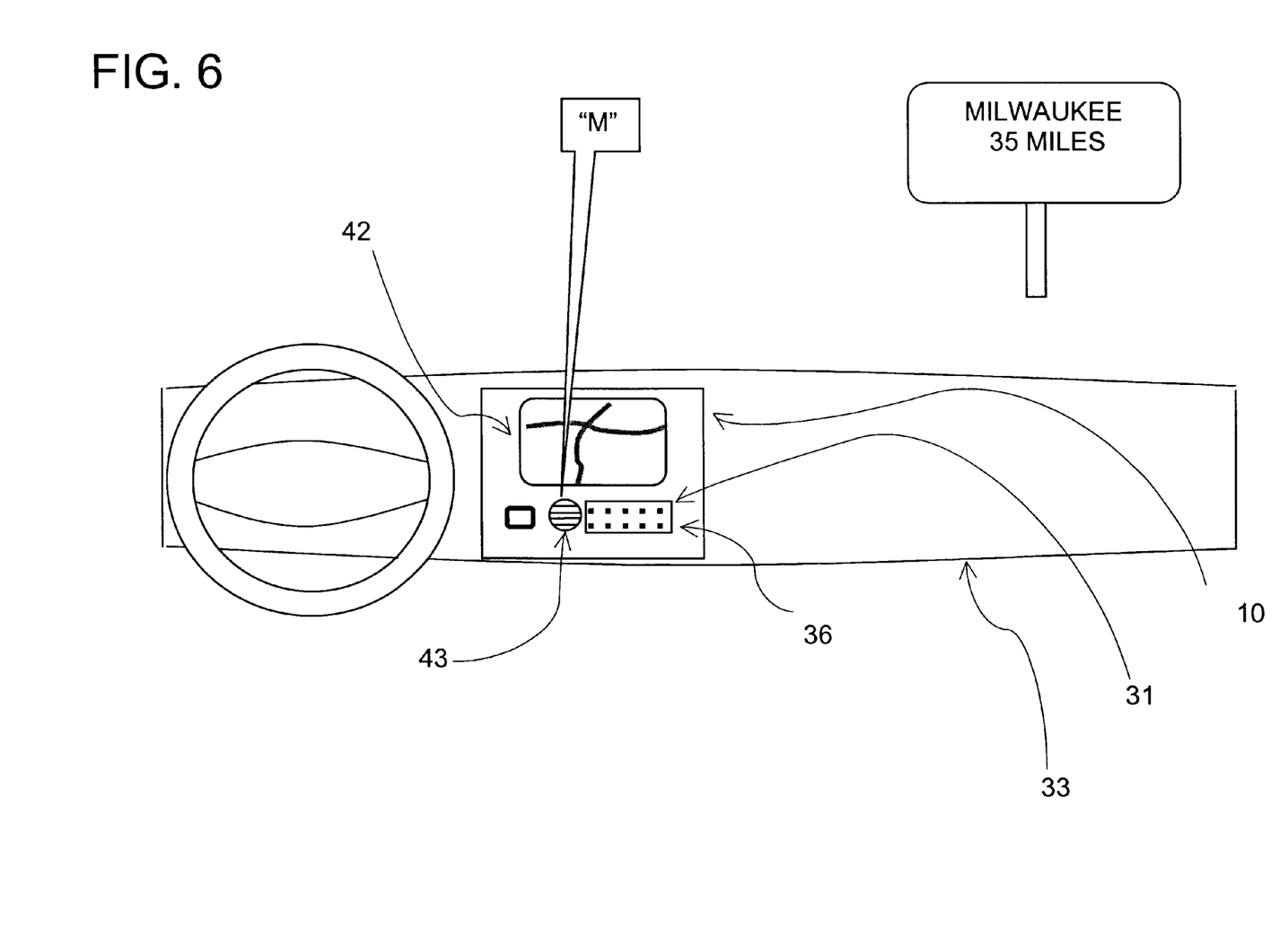
FIG. 6 depicts the dashboard of FIG. 2 and illustrates operation of one of the game applications.

In one version of the game, vehicle passengers play against each other. The sign text alphabet game application 99(1) indicates the first letter of the upcoming sign before any of the passengers can see it. Then, the vehicle passengers all try to be the first to see the sign that has the first letter indicated by the sign text alphabet game application 99(1). An example of operation of the alphabet game is shown in FIG. 6. According to this example, the sign text alphabet game application 99(1) uses the output of the vehicle positioning application 68(1) and data 70 from the geographic database to determine that the next sign has the text "MILWAUKEE 35 MILES." The sign text alphabet game application 99(1) indicates the first letter, "M", of the text of this sign using the user interface 31 (e.g., speaker 43 or display 42). Then, each of the passengers watches for the sign that has text starting with the letter "M." The first vehicle passenger who spots the sign starting with the indicated letter reads the text of the sign aloud. The sign text alphabet game application 99(1) then confirms the correct answer by indicating the entire text of the sign. The sign text alphabet game application 99(1) can indicate the correct answer when the vehicle has moved directly in front of the sign. The vehicle passengers can then keep track of whom spots the most signs first. Alternatively, the vehicle passengers can keep track of whom spots signs starting with letters of the entire alphabet first.

In an alternative version, the sign text alphabet game application 99(1) includes a virtual player. The navigation system user who starts the sign text alphabet game may select the option of having the sign text alphabet game application 99(1) create a virtual player. The virtual player indicates the first letter of an upcoming sign close to the time at which the sign should be visible to the vehicle passengers. When the sign text alphabet game application 99(1) indicates the first letter of an upcoming sign to the navigation system user, the timing may be varied so that the navigation system does not always win. The virtual player can be programmed as expert, intermediate or beginner.

In one embodiment, the sign text alphabet game application 99(1) accepts responses from the navigation system users. In order to provide this feature, the sign text alphabet game application 99(1) includes appropriate programming by which the navigation system user can provide responses to the user interface.

2. Trivia game embodiment

Another of the games provided by the navigation system 10 is a trivia game (99(2) in FIG. 1). A navigation system user can start the trivia game 99(2) by providing appropriate input into the user interface 31, e.g., by using a voice command or operation of the keypad 36, touch screen, etc.

Figure 7:
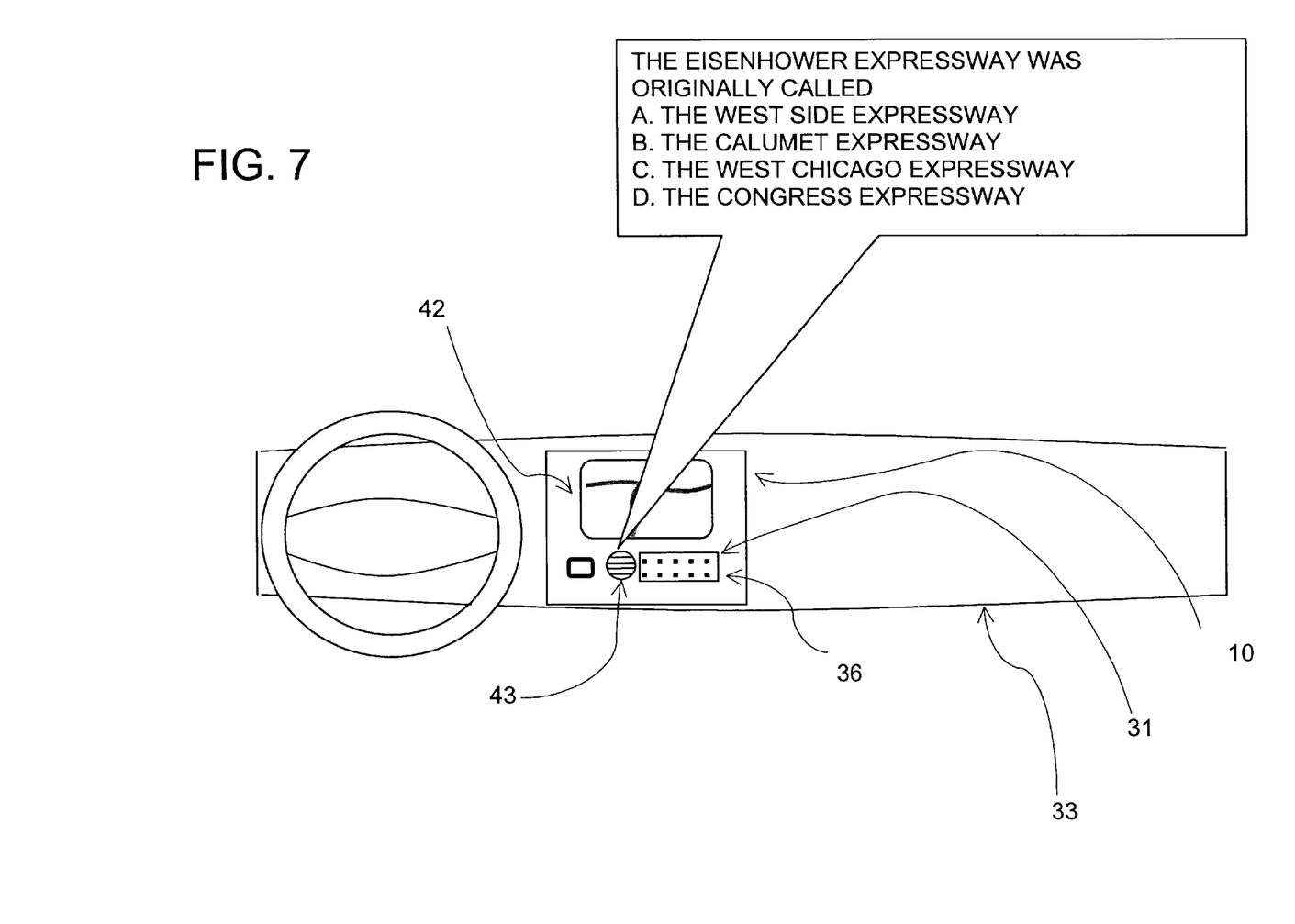
FIG. 7 depicts the dashboard of FIG. 2 and illustrates operation of another of the game applications.

When the navigation system user starts the trivia game 99(2), the game is loaded into memory and a trivia game session is begun. During a trivia game session, the trivia game application 99(2) receives the output from the vehicle positioning application 68(1) that indicates the current position of the vehicle along a road segment represented by data contained in the geographic database 72. If the vehicle is traveling along a calculated route, the trivia game 99(2) receives data indicating the road segments in the calculated route from the route calculation application 68(2) or the route guidance application 68(3). The trivia game application 99(2) also obtains game data 119. The game data 119 includes trivia questions. Some or all the trivia questions relate to locations in the geographic region represented by the geographic database 72. FIG. 7 shows an example of a geography fact trivia game question presented to the navigation system user during part of a game session. When the trivia game application 99(2) presents a trivia question to the navigation system user, the trivia game question may be presented with multiple choice answers.

Figure 8:
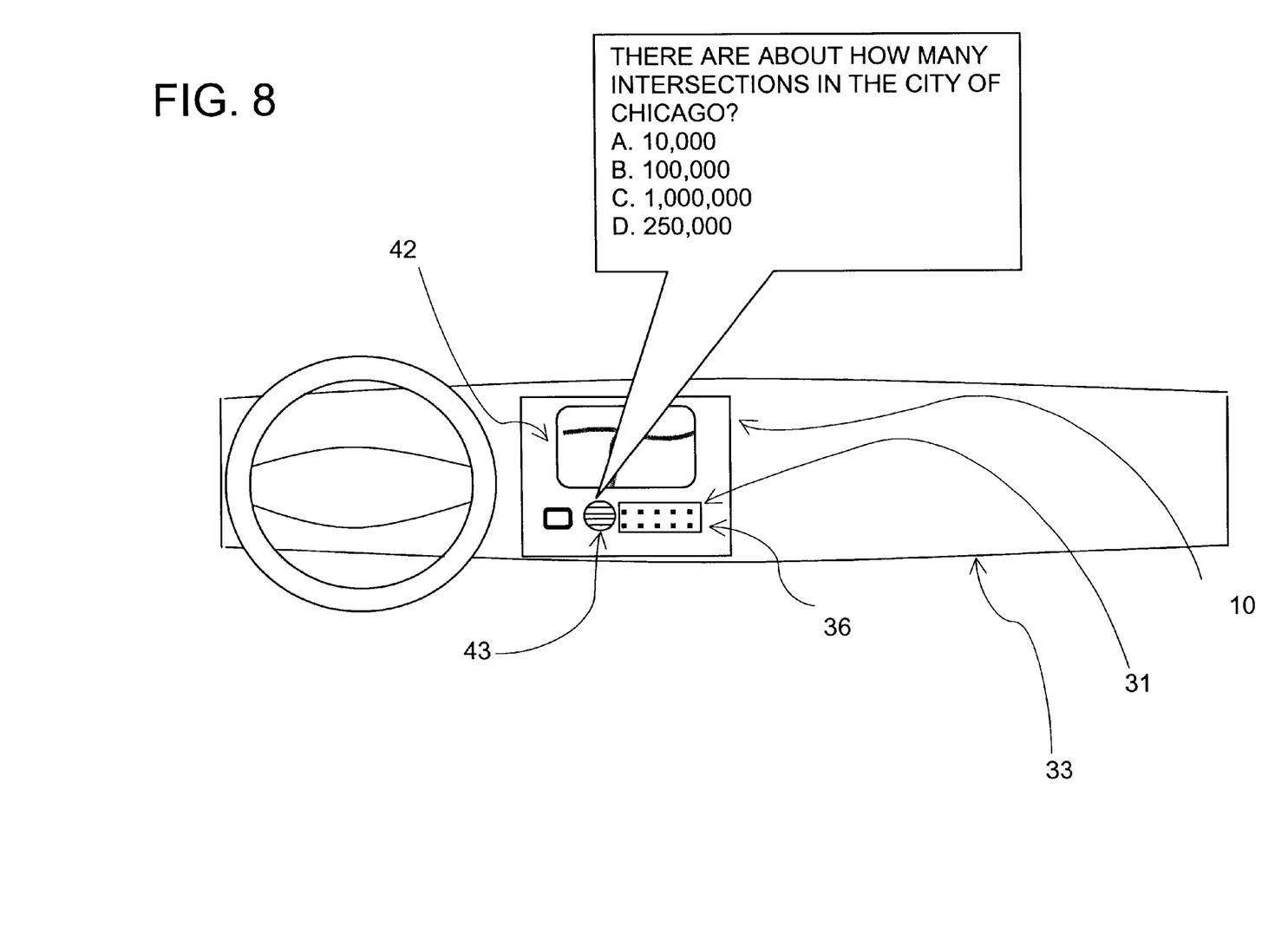
FIG. 8 depicts the dashboard of FIG. 2 and illustrates operation of yet another of the game applications.

Other trivia game questions provided by the trivia game application 99(2) may relate to obscure geographic facts. The obscure geographic facts may relate to the geographic data 70. FIG. 8 shows an example of an obscure fact trivia game question presented to the navigation system user during part of a game session.

3. Road rally game embodiment

Another of the games provided by the navigation system 10 is a road rally game (99(3) in FIG. 1). A navigation system user can start the road rally game 99(3) by providing appropriate input into the user interface 31, as described above.

When the navigation system user starts the road rally game 99(3), the game is loaded into memory and a road rally game session is begun. During a road rally game session, the road rally game application 99(3) receives the output from the vehicle positioning application 68(1) that indicates the current position of the vehicle along a road segment represented by data contained in the geographic database 72. The road rally game application 99(3) also obtains game data 1 19. The game data 119 includes road rally directions. The road rally directions provide advice for following a road rally course. The navigation system user attempts to complete the course within allotted times. The road rally game application 99(3) keeps track of the times at which the vehicle crosses specific checkpoints. The navigation system user may use the navigation system to calculate routes to rally points. The navigation system user obtains points for reaching certain checkpoints within allotted times. The road rally game application 99(3) gives the navigation system user a score based upon the navigation system user's performance.

4. Treasure hunt game embodiment

Another of the games provided by the navigation system 10 is a treasure hunt game (99(4) in FIG. 1). A navigation system user starts the treasure hunt game 99(4) by providing appropriate input into the user interface 31, as described above.

When the navigation system user starts the treasure hunt game 99(4), the game is loaded into memory and begun. During a treasure hunt game session, the treasure hunt game application 99(4) receives the output from the vehicle positioning application 68(1) that indicates the current position of the vehicle along a road segment represented by data contained in the geographic database 72. If the vehicle is traveling along a calculated route, the treasure hunt game 99(4) receives data indicating the road segments in the calculated route from the route calculation application 68(2) or the route guidance application 68(3). The treasure hunt game application 99(4) also obtains game data 119. The game data 119 includes treasure hunt items. Some or all the treasure hunt items relate to locations in the geographic region represented by the geographic database 72. As an example, the treasure hunt game can request that the navigation system user find a large order of French fries, a road map, and a library book. The navigation system user can use the navigation system search features to find a fast food restaurant that serves french fries, a gas station from which a road map can be obtained and a public library. The treasure hunt game can give hints about the closest location at which any of the items can be found. Alternatively, the treasure hunt game can rate the game player for finding the closest locations at which the indicated items can be found.

V. OTHER EMBODIMENTS AND FEATURES

The navigation system can include other games in addition to or instead of any of the games described above.

In one embodiment of the navigation system that has a game playing feature, the navigation system programming implements a prioritization of tasks. This prioritization of tasks allows the navigation system resources to be used for playing games only if the resources are not needed for a task having higher priority, such as recalculation of a route.

According to an embodiment of the navigation system that has a game playing feature, the navigation system programming does not permit playing games if the games would be distracting to the driver. Also, the navigation system programming does not permit playing games under adverse driving conditions.

In an alternative embodiment, separate hardware is included to run the navigation game features. For example, the navigation system game features can run on a separate processor with a separate memory. The navigation system game features can also have a separate user interface. If the navigation system game features have separate hardware, a communications link is included so that the navigation game features can obtain data from the navigation system, such as the vehicle position or geographic data. The communications link can be a cable or bus. In another alternative embodiment, the separate hardware used for the navigation system game features may also include a separate positioning system and a separate geographic database.

In another alternative embodiment, the hardware used to run navigation games can also be used to run other types of games.

It is intended that the foregoing detailed description be regarded as illustrative rather than limiting and that it is understood that the following claims including all equivalents are intended to define the scope of the invention.

We claim:

1. A method of operation for a vehicle navigation system, the method comprising:

accepting an input from a user of the navigation system that indicates the user's interest in playing a game;

running a game program on the vehicle navigation system, wherein the game program includes game rules and wherein the game program uses data from a geographic database and the game rules to conduct a game session via a user interface of the vehicle navigation system;

accepting input from the user of the vehicle navigation system to calculate a route to a destination specified by the user determining a position of said vehicle navigation system;

providing data indicating said position to said game program; and indicating information about a roadside sign close to said position as part of said game session;
   wherein said information about a roadside sign comprises a first letter on said roadside sign.

2. The method of claim 1 further comprising the step of:
   making said game session relevant to said position.

3. The method of claim 1 further comprising the steps of:
   providing data indicating a calculated route to said game program; and
   making said game session relevant to said calculated route.

4. The method of claim 1 further comprising the step of:
   presenting a trivia question via said user interface that relates to said position.

5. The method of claim 1 further comprising the step of:
   presenting questions about geographic features as part of another game program.

6. The method of claim 1 further comprising the step of:
   as part of said game program, forming a virtual opponent to play against the user.

7. The method of claim 1 further comprising the step of:
   as part of said game program, forming a virtual opponent to play against the user during said game session.

8. The method of claim 1 further comprising the step of:
   as part of said game program, presenting a trivia question via said user interface.

9. A vehicle navigation system comprising:

navigation system hardware comprising a processor and memory;

a user interface including hardware through which an end user can provide input requesting navigation information and hardware though which the end user can be provided navigation information;

a positioning system coupled to the navigation system hardware and adapted to provide an output indicative of a position of the navigation system;

a geographic database that contains data representing geographic features in an area around the vehicle navigation system; and navigation system programming that runs on the navigation system hardware and that uses the data in the geographic database and the output from the positioning system to provide navigation features to the end user via the user interface;

wherein the navigation system programming further comprises:

a game program that runs on the navigation system hardware and that uses the data in the geographic database to conduct a game session via the user interface, wherein the game session is a trivia game.

10. The invention of claim 9 wherein said game program uses the output of the positioning system to conduct the game session.

11. The invention of claim 9 wherein the game session presents trivia questions related to the position of the navigation system.

12. A vehicle navigation system comprising:

navigation system hardware comprising a processor and memory;

a user interface including hardware through which an end user can provide input requesting navigation information and hardware though which the end user can be provided navigation information, wherein the navigation information includes guidance for following a calculated route to a destination specified by the user;

a positioning system coupled to the navigation system hardware and adapted to provide an output indicative of a position of the navigation system;

a geographic database that contains data representing geographic features in an area around the vehicle navigation system; and navigation system programming that runs on the navigation system hardware and that uses the data in the geographic database and the output from the positioning system to provide navigation features to the end user via the user interface;

wherein the navigation system programming further comprises:

a game program that runs on the navigation system hardware and that uses the data in the geographic database to conduct a game session via the user interface;

wherein the game session is a trivia game.

13. The invention of claim 12 wherein said game program uses the output of the positioning system to conduct the game session.

14. The invention of claim 12 wherein the game session presents trivia questions related to the position of the navigation system.

15. The invention of claim 12 wherein another game session comprises an alphabet driving game.

16. The invention of claim 12 wherein another game session uses the data in the geographic database to indicate via the user interface a first letter of signs along a road upon which a vehicle, in which the navigation system is installed, is traveling.

17. A vehicle navigation system comprising:

navigation system hardware comprising a processor and memory;

a user interface including hardware through which an end user can provide input requesting navigation information and hardware though which the end user can be provided navigation information;

a positioning system coupled to the navigation system hardware and adapted to provide an output indicative of a position of the navigation system;

a geographic database that contains data representing geographic features in an area around the vehicle navigation system; and navigation system programming that runs on the navigation system hardware and that uses the data in the geographic database and the output from the positioning system to provide navigation features to the end user via the user interface;

wherein the navigation system programming further comprises:

a game program that runs on the navigation system hardware and that uses the data in the geographic database to conduct a game session via the user interface, wherein the game session is an alphabet driving game.

18. A vehicle navigation system comprising:

navigation system hardware comprising a processor and memory;

a user interface including hardware through which an end user can provide input requesting navigation information and hardware though which the end user can be provided navigation information;

a positioning system coupled to the navigation system hardware and adapted to provide an output indicative of a position of the navigation system;

a geographic database that contains data representing geographic features in an area around the vehicle navigation system; and navigation system programming that runs on the navigation system hardware and that uses the data in the geographic database and the output from the positioning system to provide navigation features to the end user via the user interface;

wherein the navigation system programming further comprises:

a game program that runs on the navigation system hardware and that uses the data in the geographic database to conduct a game session via the user interface, wherein the game session is a road rally game.

19. A vehicle navigation system comprising:

navigation system hardware comprising a processor and memory;

a user interface including hardware through which an end user can provide input requesting navigation information and hardware though which the end user can be provided navigation information;

a positioning system coupled to the navigation system hardware and adapted to provide an output indicative of a position of the navigation system;

a geographic database that contains data representing geographic features in an area around the vehicle navigation system; and navigation system programming that runs on the navigation system hardware and that uses the data in the geographic database and the output from the positioning system to provide navigation features to the end user via the user interface;

wherein the navigation system programming further comprises:

a game program that runs on the navigation system hardware and that uses the data in the geographic database to conduct a game session via the user interface, wherein the game session uses the data in the geographic database to indicate via the user interface a first letter of signs along a road upon which a vehicle in which the navigation system is installed is traveling.

20. A method of operation for a vehicle navigation system, the method comprising:
 accepting an input from a user of the vehicle navigation system that indicates the user's interest in playing a game;
 running a game program on the vehicle navigation system, wherein the game program includes game rules and wherein the game program uses data from a geographic database and the game rules to conduct a game session via a user interface of the vehicle navigation system;
 as part of said game program, presenting a trivia question via said user interface;
 determining a position of said vehicle navigation system;
 providing data indicating said position to said game program; and
 indicating information about a roadside sign close to said position as part of said game session;
 wherein said information about a roadside sign comprises a first letter on said roadside sign.

21. The method of claim 20 further comprising the step of:
 making said game session relevant to said position.

22. The method of claim 20 further comprising the steps of:
 providing data indicating a calculated route to said game program; and
 making said game session relevant to said calculated route.

23. The method of claim 20 further comprising the step of:
 presenting a trivia question via said user interface that relates to said position.

24. The method of claim 20 further comprising the step of:
 presenting questions about geographic features as part of another game program.

25. The method of claim 20 further comprising the step of:
 as part of said game program, forming a virtual opponent to play against the user.

26. The method of claim 20 further comprising the step of:
 as part of said game program, forming a virtual opponent to play against the user during said game session.

27. A vehicle navigation system comprising:
 navigation system hardware comprising a processor and memory;
 a user interface including hardware through which an end user can provide input requesting navigation information and hardware though which the end user can be provided navigation information, wherein the navigation information includes guidance for following a calculated route to a destination specified by the user;
 a positioning system coupled to the navigation system hardware and adapted to provide an output indicative of a position of the navigation system;
 a geographic database that contains data representing geographic features in an area around the vehicle navigation system; and
 navigation system programming that runs on the navigation system hardware and that uses the data in the geographic database and the output from the positioning system to provide navigation features to the end user via the user interface;
 wherein the navigation system programming further comprises:
  a game program that runs on the navigation system hardware and that uses the data in the geographic database to conduct a game session via the user interface;
  wherein the game session is a road rally game.

* * * * *